United States Patent
Akaike et al.

(10) Patent No.: US 6,668,206 B1
(45) Date of Patent: Dec. 23, 2003

(54) METHOD, APPARATUS AND MEMORY MEDIUM FOR SUPPORTING PRODUCT DEVELOPMENT

(75) Inventors: Shigeru Akaike, Okazaki (JP); Kaname Hayakawa, Toyoake (JP); Hideo Asano, Gifu (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/575,478

(22) Filed: May 19, 2000

(30) Foreign Application Priority Data

Jun. 4, 1999 (JP) .......................... 11-157999

(51) Int. Cl.[7] ............................ G06F 19/00
(52) U.S. Cl. ................ 700/98; 703/1; 703/7; 703/8; 345/420
(58) Field of Search ............... 700/97, 98, 118, 700/119, 120, 182; 706/45; 703/1, 2, 6–8; 345/418–420

(56) References Cited

U.S. PATENT DOCUMENTS 5,742,288 A * 4/1998 Nishizaka et al. .......... 345/418
6,477,518 B1 * 11/2002 Li et al. ..................... 706/45

FOREIGN PATENT DOCUMENTS

JP        A-6-259404        9/1994

OTHER PUBLICATIONS

IBM Technical Disclosure Bulletin vol. 37 No. 04A Apr. 1994 " Interactive Simplification of Solid Models" pp. 161–164.*

* cited by examiner

Primary Examiner—Leo Picard
Assistant Examiner—Steven R. Garland
(74) Attorney, Agent, or Firm—Harness, Dickey & Pierce, PLC

(57) ABSTRACT

In a product development support method and apparatus, an original solid model of a casing part of a vehicular air conditioner is formed, and an original solid model of an air space part in the casing part is formed by using the solid model of the casing unit. Analysis impediment elements are searched. The analysis impediment elements which require a long period of time for calculation process are removed from the solid model to determined an analysis solid model. Flow analysis is performed by applying boundary conditions to the analysis solid model which are divided into meshes. Analysis results are displayed so that a product model may be finalized based on the analysis results.

15 Claims, 6 Drawing Sheets

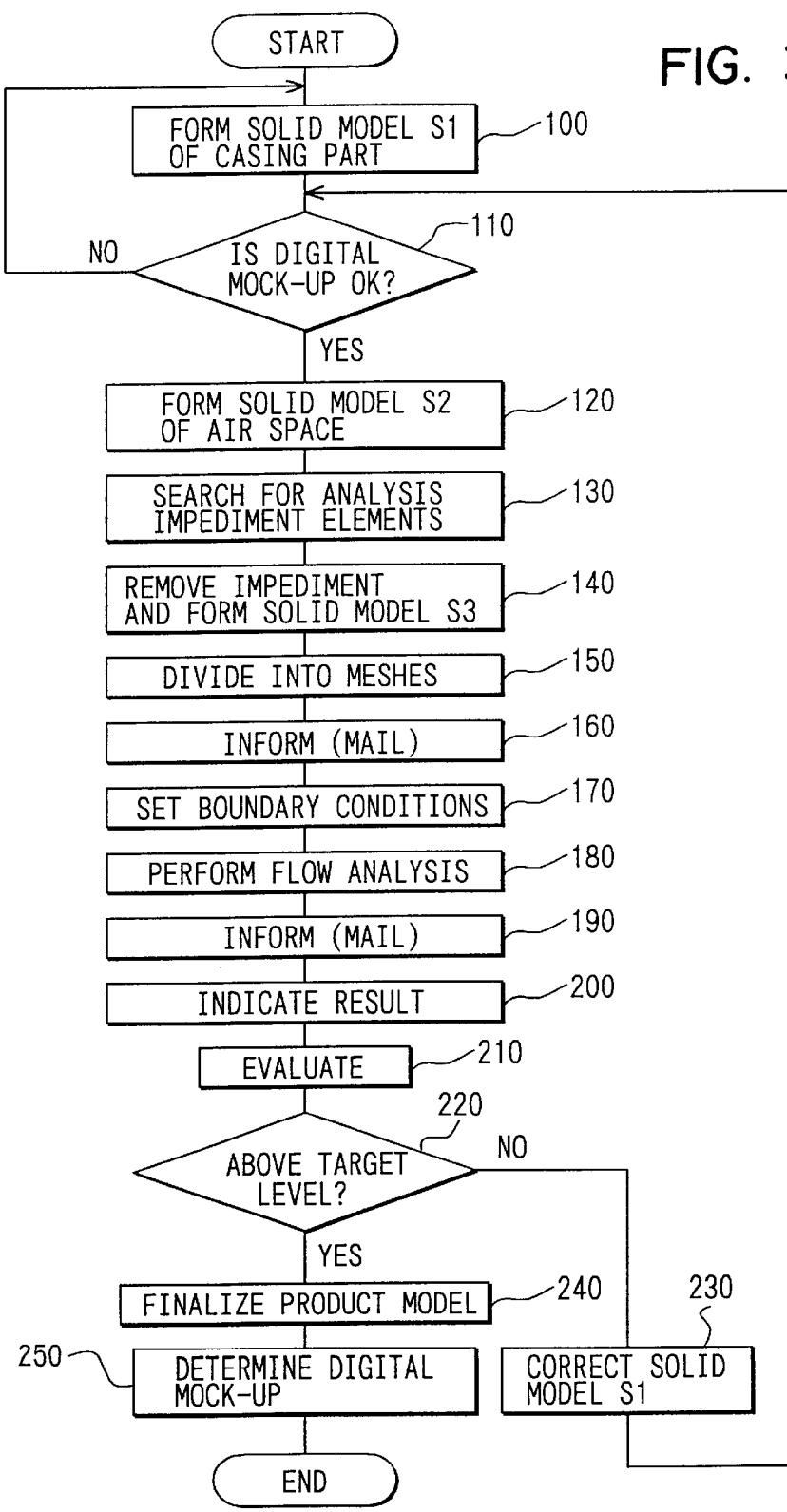

METHOD, APPARATUS AND MEMORY MEDIUM FOR SUPPORTING PRODUCT DEVELOPMENT

CROSS REFERENCE TO RELATED APPLICATION

This application relates to and incorporates herein by reference Japanese Patent Application No. 11-157999 filed on Jun. 4, 1999.

BACKGROUND OF THE INVENTION

The present invention relates to a product development support method, a product development support apparatus and a memory medium therefor which can be applied to a development of products such as a vehicular air conditioner.

It is a general practice in developing air conditioners mounted on automotive vehicles to repeat a trial manufacture and testing to finalize the product design. That is, a development product is repeatedly trial-manufactured and tested under various conditions, so that a performance of an air conditioner is determined.

In the vehicular air conditioner, dehumidification and heating functions are required. Air is once cooled by a heat exchanger. The cooled air is then heated partly or entirely again and air-mixed so that the air regulated at a desired temperature may be supplied into a vehicle compartment.

However, air-mixing is largely influenced by an internal construction of the air conditioner, that is, by size, shape of an air conditioner internal unit, by position and shape of the heat exchanger and the like. Therefore, designing vehicular air conditioners is not simple.

Specifically, testing the air-mixing performance requires a lot of manpower, because the air-mixing performance is influenced by a number of factors. As a result, designing and producing the air conditioner requires a lot of manpower and cost.

SUMMARY OF THE INVENTION

The present invention has been attained to solve the above problem, and it has an object to provide a product development support method, a product development support apparatus and a memory medium therefor which enables a product development in less time and cost.

According to the present invention, a solid model of a product to be developed is determined, and an analysis solid model is determined by removing from the solid model an analysis impediment element which impedes product analysis. A product analysis is performed by using the analysis solid model. Preferably, the solid model and/or the analysis impediment element are corrected based on the result of product analysis.

In the case of a vehicular air conditioner, the solid model is determined with respect to a casing part and its internal air space, and the analysis impediment element may be a tiny or minute part, tiny or minute edge or the like in the air space. The product analysis is performed with respect to the mode of air flow, distribution of temperature and the like in the air space.

As the analysis method, finite-element method and finite volume method are generally used. By using those methods, mass conservation equation, momentum conservation equation, energy conservation equation and the like are solved. The air flow speed, temperature and the like in the air space can be determined by numerically solving those equations. It becomes possible to evaluate if the product is acceptable once the speed and the distribution of temperature are determined.

BRIEF DESCRIPTION OF THE DRAWINGS

Other objects, features and advantages of the present invention will become more apparent from the following detailed description made with reference to the accompanying drawings. In the drawings:

FIG. 3 is a flow diagram showing a sequence of processing in a product development support method in the embodiment;

DETAILED DESCRIPTION OF THE PREFERRED EMBODIMENT

An embodiment of implementing a product development support method, product development support apparatus and a storage medium therefor according to the present invention will be described with reference to the drawings. This embodiment is directed to a product development support for a vehicular air conditioner.

Figure 1:
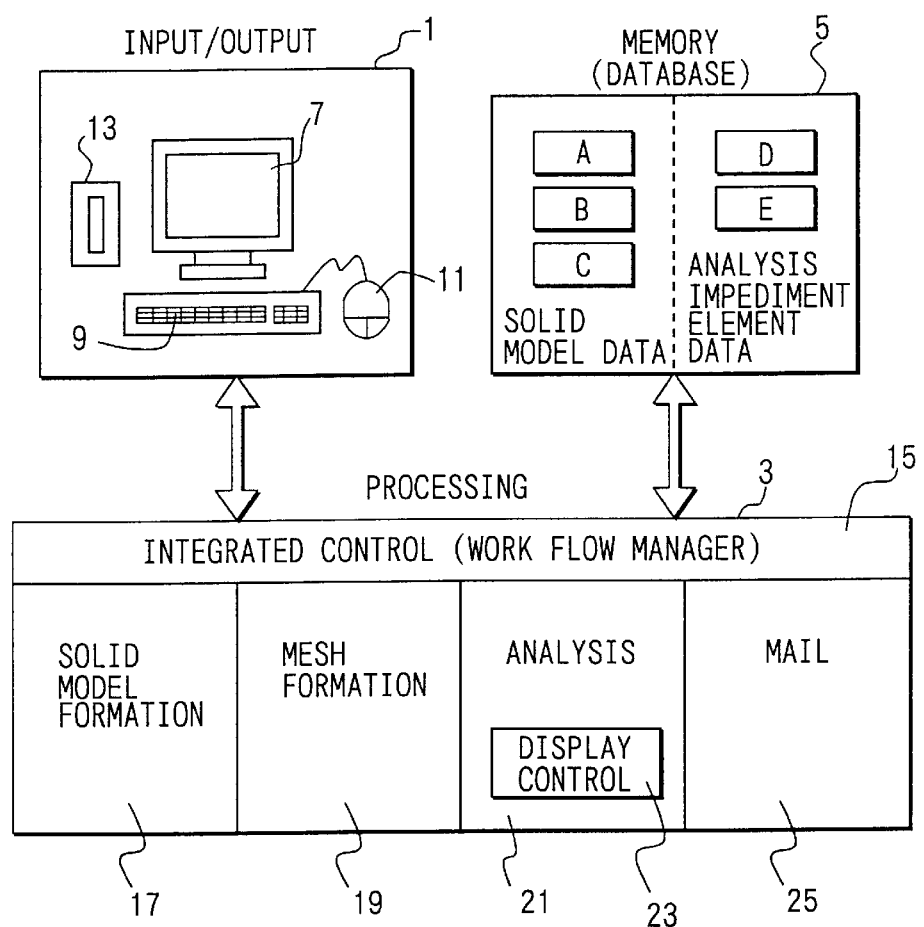
FIG. 1 is a block diagram showing a general construction of a product development support apparatus according to an embodiment of the present invention.

As shown in FIG. 1, a product development support apparatus according to the embodiment has an input/output unit 1 for inputting and outputting various data, a processing unit 3 comprised of a computer and the like for processing data, and a memory unit (database) 5 for storing data.

The input/output unit has a display 7 for indicating various information, a keyboard 9 and a mouse 11 operable by an operator such as a product development engineer for inputting data, and a reader device 13 for inputting data from a memory medium such as a floppy diskette. The input/output unit 1 may be connected to other computers for submitting or transmitting and receiving data to and from the other computers.

The processing unit 3 is functionally divided into five blocks. Specifically, the processing unit 3 has an integrated control unit 15, a solid model making or formation unit 17, a mesh formation unit 19, an analysis unit 21 including a display control unit 23, and a mail unit 25. The processing unit 3 corresponds to a function of a software (work flow manager) which controls the flow of an entire processing. The solid model formation unit 17 corresponds to a function of a computer-aided design (CAD) software for forming a three-dimensional (3D) solid model. The mesh formation unit 19 corresponds a function of a mesh formation software for forming a tetra mesh for an air flow analysis and inputting boundary conditions. The analysis unit 21 corresponds to a function of an analysis software for the air flow analysis. The display control unit 23 corresponds to a function of a result display software for indicating the analysis result. The mail unit 25 corresponds to a function of a mail software for informing a progress of processing.

The memory unit 5 has storage areas for storing data of the solid model and data related to analysis impediment elements. Storage area A stores therein data of an original solid model S1 of a casing part (hardware part of a frame body or a door) of a vehicular air conditioner. Storage area B stores therein data of an original solid model S2 of an internal construction (air space) of the casing part. Storage area C stores therein data of an analysis solid model S3 which is determined by removing the analysis impediment elements from the data of the solid model S2 of the air space. The analysis solid model S3 is subjected to the analysis operation. Storage area D stores therein data for automatically searching for the analysis impediment elements. Storage area E stores therein data of the analysis impediment elements actually removed from the solid model S2 of the air space.

Figure 2:
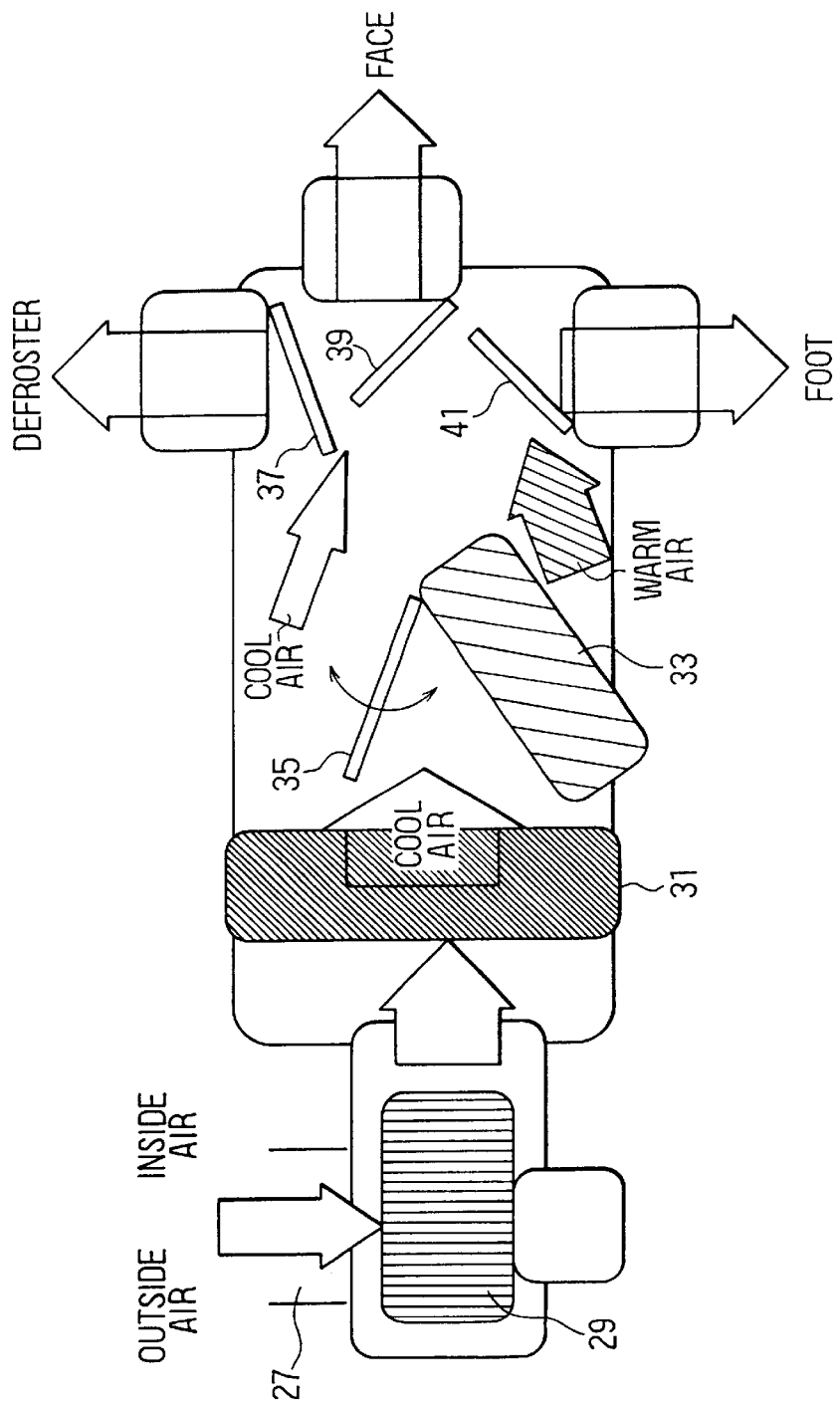
FIG. 2 is a schematic view showing an internal construction of a vehicular air conditioner in the embodiment.

Each of the solid models S1, S2 and S3 is not only one type. Rather, it is stored for each of plural types in correspondence with various conditions such as opening angle of an air-mixing door 35 and opening/closing of other doors 37, 39 and 41 (FIG. 2). Those data are correlated so that it may be possible to perform various works such as adding the removed analysis impediment elements to the analysis solid model S3 to be analyzed.

The vehicular air conditioner is generally constructed as shown in FIG. 2. In this air conditioner, outside air or inside air introduced through an intake passage 27 is supplied into the internal side of the vehicular air conditioner by a blower 29. The air supplied into the internal side is cooled by an evaporator 31, and divided by an air-mixing door 35 into air which is and is not supplied to a heater core 33.

The air supplied to the heater core 33 is warmed by a heater core 33. The air not supplied to the heater core 33 is supplied as it is, and mixed at the downstream side so that the temperature of air is regulated.

Then, the mixed air is supplied to a defroster side (for instance, front windshield side of a vehicle) through a first door 37 based on opening/closing condition of the first door 37, when the first door 37 is open. The mixed air is supplied to a face side of a passenger (for instance, from a central opening of a dashboard of a vehicle) through a second door 39 based on opening/closing condition of the second door 39, when the second door 39 is open. The mixed air is supplied to a foot side of the passenger (for instance, from a bottom opening of the dashboard of the vehicle) through a third door 41 based on opening/closing condition of the third door 41, when the third door 41 is open.

A product development support is performed as shown in FIG. 3 by using the product development support apparatus shown in FIG. 1.

As shown in FIG. 3, the original solid model S1 of the casing part of the vehicular air conditioner is formed at step 100. Specifically, the data required for forming the solid model S1 are input from the input/output unit 1 to the processing unit 3. For instance, the related data of the casing part stored in the memory unit 5 are retrieved, or data of other computers are retrieved. Alternatively, the data may be manually input by using the keyboard 9 or the mouse 11. The data may be input by combining both methods. In the solid model formation unit 17, the three-dimensional (3D) solid model of the casing part of the vehicular air conditioner is formed by applying the input data to the 3D-CAD software such as UNIGRAPHICS.

In this process, different door angles are set by using the input image indicated on the display 7 so that the solid models S1 having different angles of the each door (35–41) are provided.

At the following step 110, a digital mock-up (study of assembly in the computer) is determined by using the solid model S1 of the casing part of the vehicular air conditioner formed at step 100. It is checked whether such a vehicular air conditioner is practically mountable in the vehicle. The processing proceeds to step 120, if it is mountable (YES). The processing returns to step 100 to form another solid model S1 of the casing part, if it is not mountable (NO).

At step 120, the original solid model S2 of the air space part in the casing part is formed by using the solid model S1 of the casing part. In the solid model formation unit 17, the three dimensional solid model S2 of the internal air space of the casing part is determined. In this process, other solid models S2 of the air space part are formed in the similar manner with respect to other types having different angles of each door (35–41).

The analysis impediment elements are searched for at the following step 130. This processing searches for parts (analysis impediment elements) which will require a long period of time for computer calculation processing in performing the flow analysis later with respect to the solid model S2 of the air space part. This searching can be automatically performed based on the data of typical analysis impediment elements stored in advance in the storage area D of the memory unit 5. It is also possible to perform searching by manually designating analysis impediment elements which have predetermined shapes.

Figure 5A:
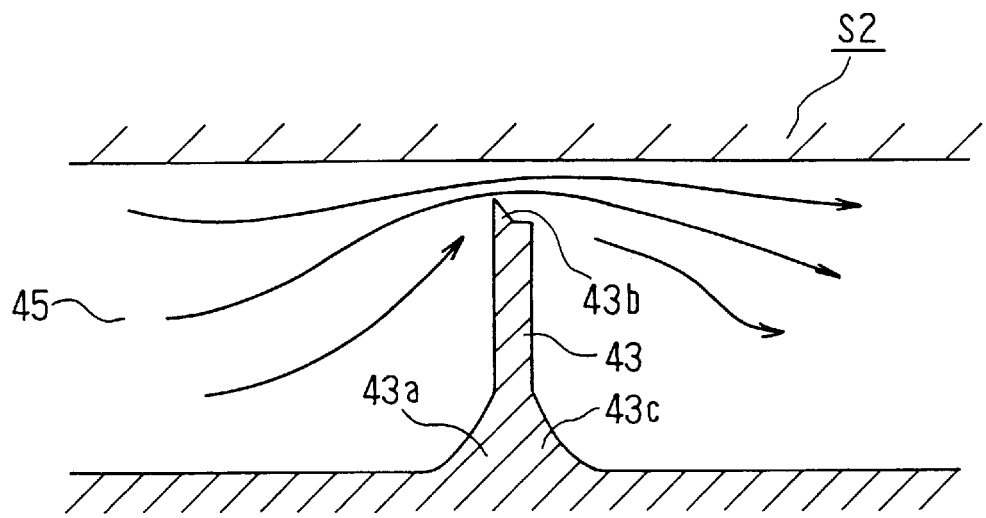
FIG. 5A is a schematic sectional view showing a solid model which has analysis impediment elements.

FIG. 5A shows an example of the solid model S2 in which a plate 43 protrudes into an air flow passage 45 of the air space part. The analysis result is not influenced so much, even when the flow analysis is performed by removing a rounded part (R-part) 43a or 43c formed upstream or downstream the root of the plate 43 or an acute edge 43b formed on the top of the plate 43. If meshes are formed in the R-part 43a or 43c or the edge part 43b, very fine meshes are required and analysis takes a very long time. Therefore, those elements which take long period of time for analysis are searched for as the analysis impediments.

Figure 4A:
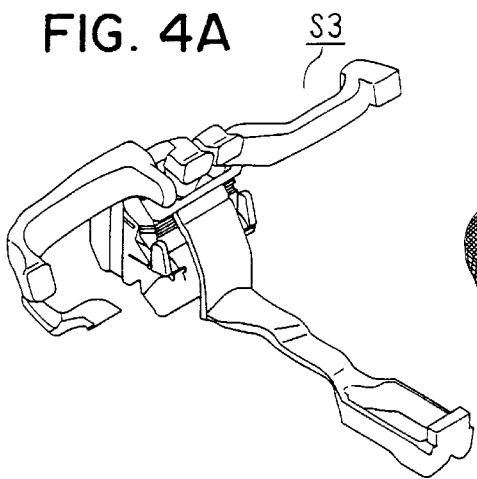
FIG. 4A is a schematic view showing an analysis solid model used in the embodiment.
Figure 5B:
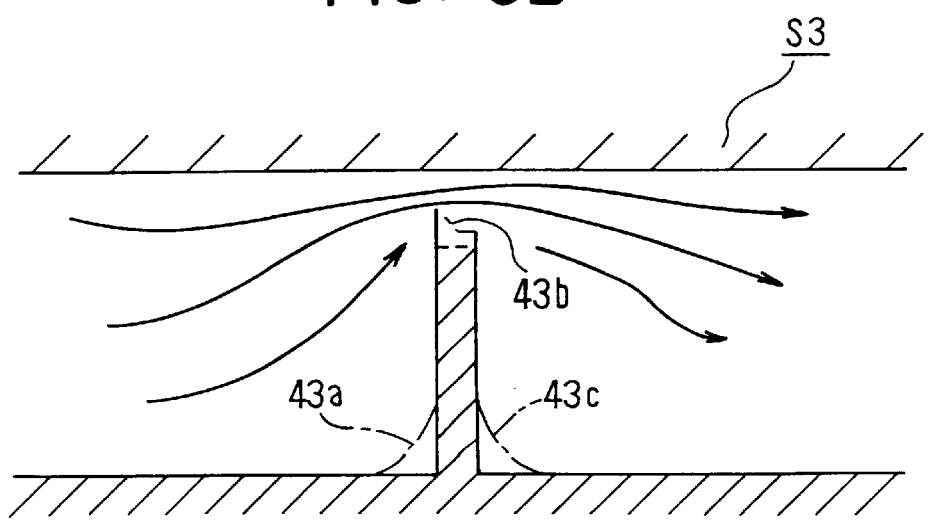
FIG. 5B is a schematic sectional view showing the analysis solid model in which the analysis impediment elements are removed.

At the following step 140, the analysis impediment elements found in searching at step 130 are removed. Specifically, the analysis impediment elements found in the above searching step 130 are checked and removed automatically or manually so that the analysis solid model S3 for analysis is formed as shown in FIG. 4A. Other solid models S3 are formed in the similar manner with respect to other types in which the angles of each door (35–41) are different. Data of the removed analysis impediment elements are stored in the storage area E of the memory unit 5. As a result, as shown in FIG. 5B, the analysis solid model S3 is formed by removing the analysis impediment elements (R-part 43*a* or 43*c* and edge 43*b*) from the solid model (solid model S2 of the air space part in practice).

Figure 4B:
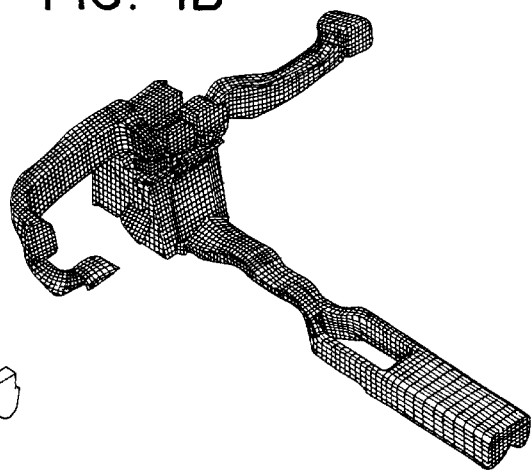
FIG. 4B is a schematic view showing a mesh-divided condition of the analysis solid model shown in FIG. 4A.

The data of the analysis solid-model S3 is retrieved by the mesh formation unit 19 at step 150. Then, as shown in FIG. 4B, a tetra mesh is formed (mesh division) with respect to the analysis solid model S3. At the following step 160, the display 7 is driven to display and inform to the operator that the formation of meshes has been completed, by using the mail software by the mail unit 25.

Then, at step 170, an input request image which requests input of the boundary conditions is indicated on the display 7 by using the mesh formation software of the mesh formation unit 19. The boundary conditions required to analyze the flow are set, when the operator inputs the boundary conditions such as blower flow amount, heat exchange amount and pressure loss of the heat exchanger by using the keyboard 9 or the mouse 11 in correspondence with the input request image.

At the following step 180, the flow analysis is performed by applying the input boundary conditions to the analysis solid model S3 which is divided into meshes. In this process, the flow analysis is performed in the similar manner with respect to the other models in which the angles of each door (35–41) are changed. Specifically, the flow analysis is performed by using a flow analysis software such as STAR-SD. Then, at step 190, the completion of the flow analysis is indicated on the display 7 and informed to the operator by using the mail software in the mail unit 25.

Figure 4C:
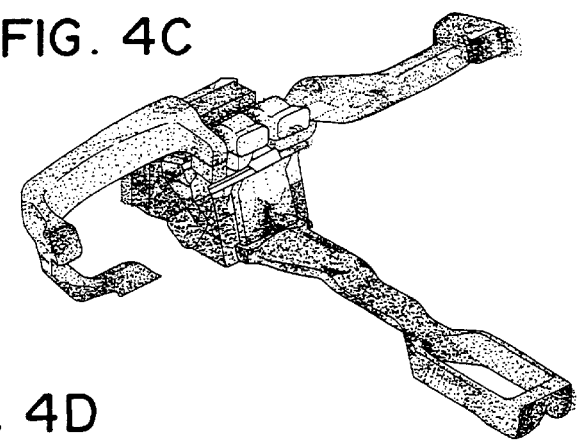
FIG. 4C is a schematic view showing an air flow speed distribution in the analysis solid model.

At the following step 200, various analysis results are indicated by using a result display software in the display control unit 23. For instance, the display 7 is constructed to enable selection of pressure distribution, pressure loss, flow rate distribution, velocity distribution and temperature distribution, and indicate thereon the analysis result of the selected items. For instance, the velocity distribution is indicated as shown in FIG. 4C in which darker part shows higher velocity.

Figure 4D:
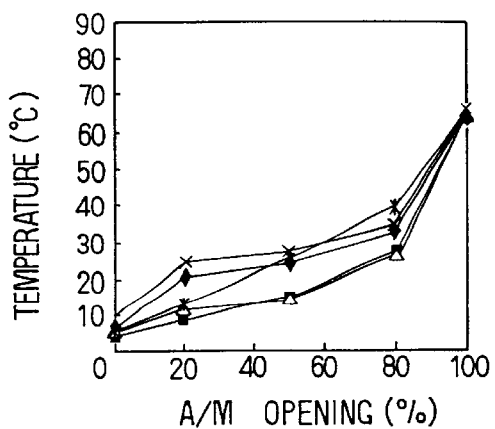
FIG. 4D is a graph showing a basic performance of the analysis solid model.

Further, in addition to the display of the above analysis result, the basic performance of the air conditioner can be displayed as shown in FIG. 4D by using the result display software. For instance, a relation between the opening angle of the air-mixing door 35 (A/M opening angle) and temperature. In this figure, mark ♦ indicates temperature at a side face air outlet opening (driver seat side), ■ indicates temperature at a central face air outlet opening (driver seat side), Δ indicates temperature at a central face air outlet opening (passenger seat side), X temperature at a side face air outlet opening (passenger seat side), and * indicates temperature at a rear face air outlet opening. The result display software may be realized as a part of the function of STAR-SD.

At the following step 210, the performance of the air conditioner is evaluated. For instance, the pressure loss, air flow rate of the air outlet opening and temperature control performance and the like of the air conditioner are evaluated based on the above displayed results. The evaluated result is compared with a target level at step 210.

The processing proceeds to step 230, if it is below the target level (NO). The solid models S1 to S3 are revised at step 230 to attain the target level, because the evaluation result is below the target level. Specifically, the solid model S1 of the casing part is corrected by using the 3D-CAD software, and steps 110–220 are repeated until the target level is attained.

The processing proceeds to step 240, if it is above the target level (YES). At step 240 the analysis solid model S3 is determined to be appropriate, because the evaluation result is above the target level. The analysis solid model S3 of the casing part corresponding to the analysis solid model S3 is finalized as a solid model (solid pattern) of a final product model which satisfies the requirements of the product.

At the following step 250, a digital mock-up is produced by using the solid pattern of the product model. Then, this digital mock-up is coupled to a conventional CAM (computer-aided manufacturing) process, thus ending the above sequence.

The above processing performed by each software of the processing unit 3 is summarized as follows.

Processing of forming the original solid model of the casing part (step 100), forming the original solid model of the air space part (step 120), searching for the analysis impediment elements (step 130) and removing the analysis impediment elements (step 140) are performed by a CAD software of the solid model formation unit 17.

Processing of dividing into meshes (step 150) and setting the boundary conditions (step 170) are mostly performed by the mesh formation software of the mesh formation unit 19. Further, processing of analyzing the air flow (step 180) is performed by the analysis software of the analysis unit 21. In addition, processing of indicating the analysis result (step 200) is performed by the result display software of the display control unit 23. Processing of informing each information via the mail (steps 160 and 190) are performed by the mail software of the mail unit 25.

As described above, according to the present embodiment, the solid model S2 of the air space part is formed from the solid model S1 of the casing part of the vehicular air conditioner. The analysis solid model S3 of the air space part is formed by removing the analysis impediment elements from the solid model S2 of the air space part. The air flow is analyzed by using the analysis solid model S3. Thus, the calculation processing time can be shortened in comparison with the case in which the analysis impediment elements are not removed. As a result, not only the product development period can be shortened, but also the development cost can be reduced.

In the case that it is determined as a result of the flow analysis that the vehicular air conditioner attains the target level, the analysis solid model S3 of the casing part corresponding to its analysis solid model S3 can be finalized as the solid pattern of the product model which attains the target level.

That is, the relation between the data of the removed analysis impediment elements and the data of the solid models S2 and S3 from which the analysis impediment elements are to be removed is definite. Therefore, a desirable product model can be finalized and produced with ease from those data.

It is to be noted that the present invention should not be limited to the above embodiment, but may be implemented in the following various ways without departing from the scope of the present invention.

Figure 6A:
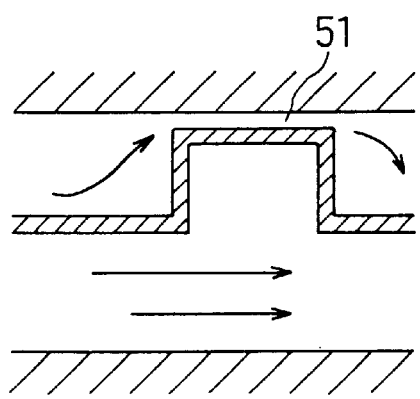
FIG. 6A is a schematic sectional view showing another solid model which has an air space.
Figure 6B:
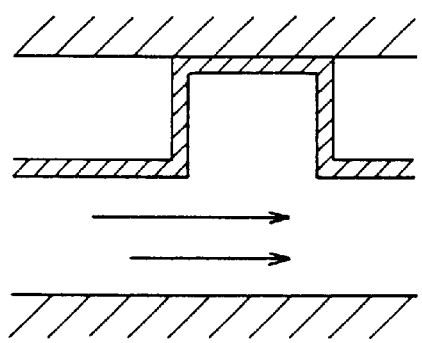
FIG. 6B is a schematic sectional view showing another analysis solid model in which the air space is removed from the solid model shown in FIG. 6A.
Figure 6C:
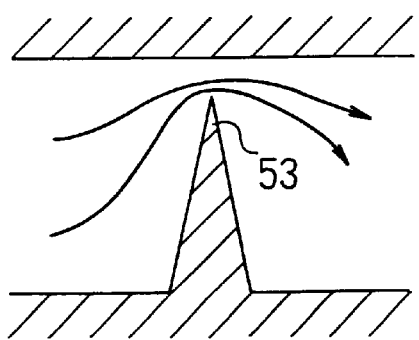
FIG. 6C is a schematic sectional view showing a further solid model which has an acute edge.
Figure 6D:
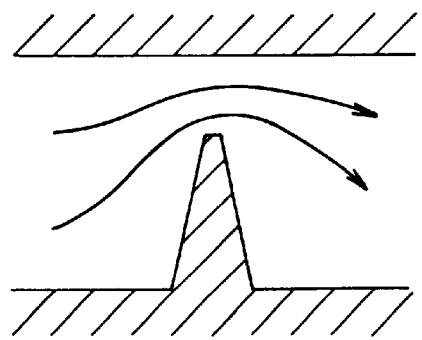
FIG. 6D is a schematic sectional view showing a further analysis solid model in which the acute edge is removed the solid model shown in FIG. 6C.

(1) The analysis impediment elements to be removed may include various elements other than the minute elements (for instance, R-part 43*a*) or the minute edge (for instance, edge 43*b*). For instance, in the case of a minute element such as an air space 51 shown in FIG. 6A, the air flow analysis can be performed by using a solid model from which the air space 51 is removed as the analysis impediment element as shown in FIG. 6B. Further, in the case of a minute edge such as an acute edge 53 shown in FIG. 6C, the air flow analysis can be performed by using a solid model from which the acute edge 53 is removed as the analysis impediment element as shown in FIG. 6D.

(2) The method of analysis by removing the above analysis impediment elements in advance can be applied to other analysis method such as a structure analysis.

(3) Further, the present invention is not limited to the above product development support apparatus, but can be applied to a memory medium which stores means for performing the above processing. The memory medium may include various memory devices such as a microchip, floppy diskette, hard disk or optical diskette. It is not specifically limited but may be any medium which stores means such as programs, as long as it is capable of attaining the above processing of an electronic control apparatus.

What is claimed is:

1. A product development support method comprising:
   a first process of producing an original solid model of a product to be developed, the first process including determining a solid model of a casing part of the product, and then determining a solid model of an air space part in the casing part;
   a second process of producing an analysis solid model by removing from the original solid model an analysis impediment element which impedes product analysis; and
   a third process of performing the product analysis by using the analysis solid model.

2. A product development support method as in claim 1, wherein:
   the second process includes searching for the impediment element, and then removing the impediment element.

3. A product development support method as in claim 1, wherein:
   the third process includes analyzing a flow by using the analysis solid model.

4. A product development support method as in claim 1, further comprising:
   a fourth process of evaluating an analysis result of the third process.

5. A product development support method as in claim 4, further comprising:
   a fifth process for correcting the solid model based on an evaluation result of the fourth process.

6. A product development support method as in claim 4, wherein:
   the impediment element to be removed is corrected based on the evaluation result of the fourth process.

7. A product development support method as in claim 1, wherein:
   the impediment element to be removed includes any one of a minute part, a minute edge, a narrow space and an acute edge.

8. A product development support apparatus comprising:
   first means for producing an original solid model of a product to be developed based on input data, the original solid model included a casing part of the product and an air space part in the casing part;
   second means for producing an analysis solid model by removing from the solid model an impediment element which impedes product analysis; and
   third means for performing the product analysis based on a boundary condition by using the analysis solid model.

9. A product development support apparatus as in claim 8, further comprising:
   fourth means for informing an analysis result of the third means.

10. A memory medium comprising:
    a program which defines means for performing functions of the product development apparatus of claim 9.

11. A product development support apparatus as in claim 8, further comprising:
    fifth means for informing a progress of performance of each of the means.

12. A memory medium comprising:
    a program which defines means for performing functions of the product development apparatus of claim 11.

13. A product development support apparatus as in claim 8, wherein:
    each of the means includes a computer software to execute a corresponding process.

14. A memory medium comprising:
    a program which defines means for performing functions of the product development apparatus of claim 13.

15. A memory medium comprising:
    a program which defines means for performing functions of the product development apparatus of claim 8.

* * * * *